United States Patent [19]

Shibata et al.

[11] Patent Number: 5,633,050
[45] Date of Patent: May 27, 1997

[54] METHOD FOR PRODUCING A MAGNETIC RECORDING MEDIUM INCLUDING WET ORIENTATION WITHOUT AGGLOMERATION OF MAGNETIC PARTICLES

[75] Inventors: Norio Shibata; Shinsuke Takahashi, both of Kanagawa, Japan

[73] Assignee: Fuji Photo Film Co., Ltd., Kanagawa, Japan

[21] Appl. No.: 500,556

[22] Filed: Jul. 11, 1995

Related U.S. Application Data

[63] Continuation of Ser. No. 233,984, Apr. 28, 1994, abandoned.

[30] Foreign Application Priority Data

Apr. 27, 1993 [JP] Japan ................................. 5-122133

[51] Int. Cl.$^6$ ........................................................... H01F 1/00
[52] U.S. Cl. ........................ 427/548; 427/549; 427/550; 427/130; 427/131
[58] Field of Search ............................. 427/548, 549, 427/550, 131, 130

[56] References Cited

U.S. PATENT DOCUMENTS

| | | | |
|---|---|---|---|
| 4,745,001 | 5/1988 | Miyoshi et al. | 427/549 |
| 4,844,946 | 7/1989 | Komatsu et al. | 427/130 |
| 4,874,633 | 10/1989 | Komatsu et al. | 427/549 |
| 4,999,217 | 3/1991 | Watanabe et al. | 427/130 |
| 5,229,173 | 7/1993 | Suzuki et al. | 427/549 |
| 5,336,559 | 8/1994 | Yamagishi et al. | 427/130 |

*Primary Examiner*—Katherine A. Bareford
*Attorney, Agent, or Firm*—Sughrue, Mion, Zinn, Macpeak & Seas

[57] ABSTRACT

A method for producing a magnetic recording medium which results in the effective oblique orientation of magnetic fine particles without aggregation of the particles. The method results in a magnetic recording medium having an upper magnetic layer containing needle-shaped, granular, or plate-like magnetic particles, and at least one lower nonmagnetic layer formed on a nonmagnetic support so that the magnetic particles have the maximum degree of orientation in an oblique or perpendicular direction with respect to a surface of the support. The oblique or perpendicular orientation is performed in the wet state of a magnetic layer and in the condition in which the amount of the solvent residue in the upper magnetic layer is 40 to 80% after the upper magnetic layer and the lower nonmagnetic layer are applied sequentially or simultaneously to form a multilayer. The upper magnetic layer is formed so as to be thinner than the lower nonmagnetic layer and subjected to horizontal orientation with a plane of the surface of the support.

9 Claims, 5 Drawing Sheets

METHOD FOR PRODUCING A MAGNETIC RECORDING MEDIUM INCLUDING WET ORIENTATION WITHOUT AGGLOMERATION OF MAGNETIC PARTICLES

This is a Continuation of Application No. 08/233,984 filed Apr. 28, 1994, now abandoned.

FIELD OF THE INVENTION

The instant invention relates to a method for producing a magnetic recording medium and particularly to a method for producing a magnetic recording medium which has a magnetic layer containing magnetic particles oriented obliquely or perpendicularly with respect to the plane of the support and on which high-density recording can be performed.

BACKGROUND OF THE INVENTION

Heretofore, magnetic recording media such as a magnetic tape, a floppy disk, and so on, are produced generally by the steps of: applying a coating composition prepared by dispersing magnetic fine particles in a resin dissolved by an organic solvent onto a running belt-like flexible support; orienting to desired direction easily-magnetizable axes of the fine magnetic particles in the coating composition applied on the support, drying and solidifying the applied coating composition, and surface-treating the resulted coating layer such as calendering, thereby obtaining a belt-like magnetic recording medium; and slitting, cutting or punching the belt-like magnetic recording medium to obtain a magnetic tape having a desired width or a magnetic disk having a desired shape.

Recording a large amount of information in a limited recording area, that is, high-density recording, has been required increasingly of magnetic tapes and floppy disks. Reduction in the size of a magnetic head therefore has been desired because the magnetic flux generated from the magnetic head must be concentrated in a fine area. The volume of the magnetic layer capable of inverting the direction of magnetization decreases with the reduction in generated magnetic flux caused by minimizing the size of the magnetic head. Therefore, it is necessary to thin the magnetic layer for the purpose of obtaining high-density recording.

Although it is necessary in high-density recording to thin the magnetic layer beyond that found in the magnetic layer of a conventional recording medium, in the case where such a thin film is formed singly, not only is it very difficult to form a faultless uniform coating but also it is nearly impossible to perform sufficient orienting treatments because drying/solidification of the layer is completed rapidly.

Figure 9:
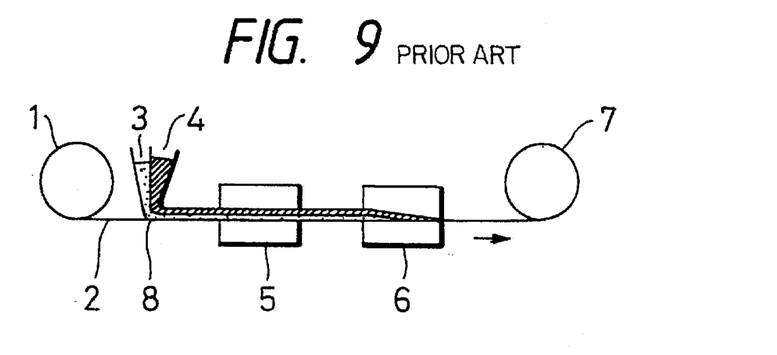
FIG. 9 is a schematic view showing a conventional magnetic recording medium producing method.

To solve that problem, for example, Japanese Patent Unexamined Publication No. Sho-62-212933 proposed a method of the type in which, as shown in FIG. 9, a simultaneous multilayer coating apparatus 8 applies a lower-layer magnetic coating composition 3 and an upper-layer magnetic coating composition 4 onto a nonmagnetic support 2 drawn out of a feed roll 1; an orientation apparatus 5 performs an orienting treatment while the two layers are not yet dried; a drier 6 dries the layers; and the resulting support is taken up by a takeup unit 7. It is asserted that orientation of ferromagnetic fine particles in the upper thin magnetic layer is obtained.

Figure 10:
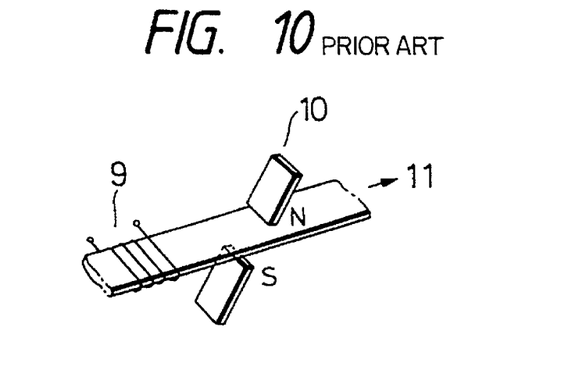
FIG. 10 shows an oblique orientation apparatus in the conventional magnetic recording medium producing method.

Heretofore, it is in most cases difficult to orient magnetic fine particles obliquely compared with the general in-plane orientation of conventional materials (lengthwise orientation). Japanese Patent Unexamined Publication No. Hei-2-146106 asserted that orientation of particles can be performed securely when in-plane orientation is performed with an electromagnet for lengthwise orientation before a magnetic recording medium 11 in a wet state is subjected to oblique orientation by a permanent magnet 10 for oblique orientation as shown in FIG. 10.

However, when magnetic fine particles in a high wet state (a low dry state) are oriented strongly, the magnetic fine particles tend to aggregate. Thus, the magnetic fine particles are distributed unevenly on the support. If, on the other hand, magnetic field intensity for orientation is lowered to avoid aggregation, the size of the apparatus for orienting the particles must be increased greatly to obtain sufficient orientation.

SUMMARY OF THE INVENTION

An object of the instant invention is to provide a method for producing a recording medium adapted to high-density recording, in which magnetic fine particles in a wet-state magnetic layer can be subjected to oblique or perpendicular orientation effectively without aggregation.

The foregoing object of the instant invention is achieved by a method for producing a magnetic recording medium comprising a non-magnetic support having thereon, in order, a lower non-magnetic layer and an upper magnetic layer having a thickness which is less than that of the lower non-magnetic layer and containing magnetic powders, which comprises steps of applying a solvent-solution for the lower non-magnetic layer and a solvent-solution for the upper magnetic layer to the support sequentially or simultaneously to form the solvent-solution layers, subjecting a horizontal orientation of the easily-magnetizable axes along a surface of the support, subjecting the oblique or perpendicular orientation with respect to the surface of the support under the condition that a residual amount of the solvent in the upper magnetic layer is within a range of 40% to 80% by weight based on the total weight of the solvent in the solvent-solution for the upper magnetic layer, and drying the solvent-solution layers to evaporate those solvents.

The term "horizontal orientation" used herein designates an inclined angle of the easily-magnetizable axes within a range of $-5°$ to $5°$ in average thereof with respect to a plane parallel to the surface of the support. On the other hand, the term "oblique direction" used herein designates an inclined angle of the easily-magnetizable axes within a range of $-65°$ to $65°$ in average thereof with respect to a plane perpendicular to the surface of the support.

DETAILED DESCRIPTION OF THE INVENTION

A method for producing a magnetic recording medium according to the instant invention will be described in detail, and with reference to the drawings.

Figure 1:
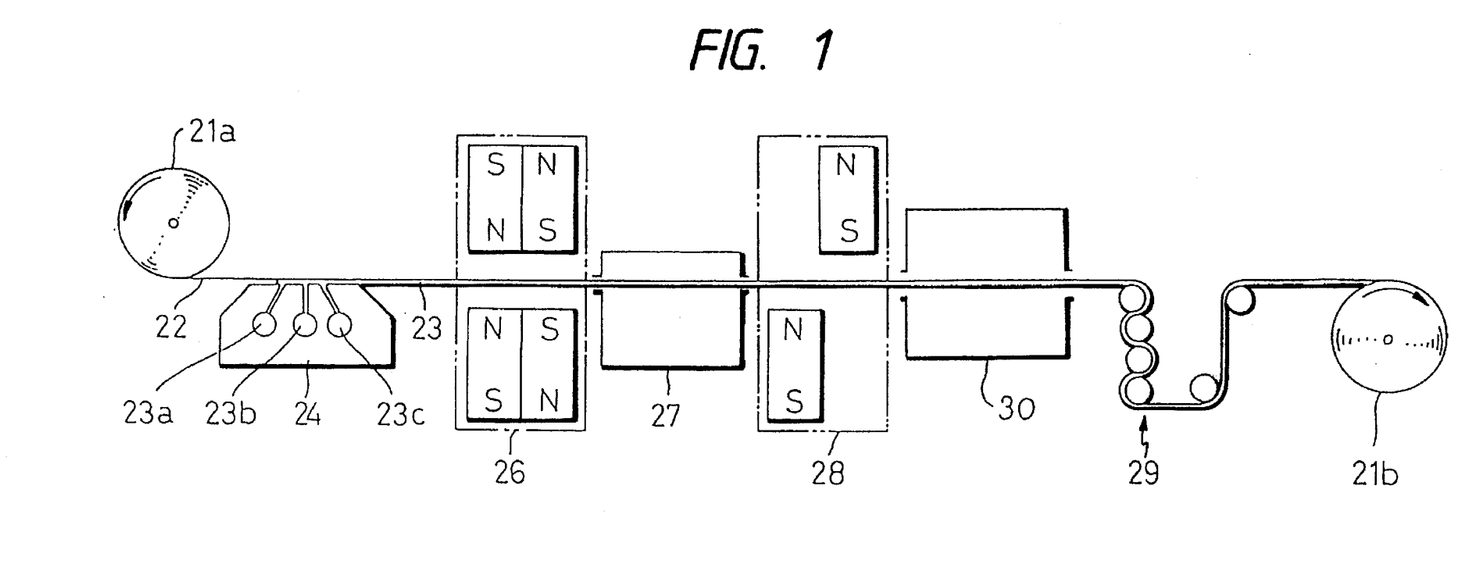
FIG. 1 is a schematic view of a magnetic recording medium producing apparatus used according to the instant invention.

Referring to FIG. 1, 21a is a feed roll; 21b is a takeup roll; 22 is a nonmagnetic support; 23 is a magnetic recording medium; 24 is a coating apparatus; 26 is a lengthwise orientation apparatus; 27 and 30 are driers; 28 is an oblique orientation apparatus; and 29 is a calendering apparatus.

In an apparatus shown in FIG. 1, for example, an extrusion coating apparatus 24 applies one or two nonmagnetic layers 23a and 23b and a magnetic layer 23c (in the drawing, applies three layers simultaneously) onto a nonmagnetic support 22 drawn out of a feed roll 21a to form a wet-state coating layer 23. In the condition in which the residual amount of a solvent is high, preparatory orientation is performed by a lengthwise orientation apparatus 26. In case where the horizontal orientation of the easily-magnetizable axes of the magnetic powder along a surface of the nonmagnetic support is performed, a magnetic field having the intensity of 100% to 600%, more preferably 100% to 400% against the magnetic force of the magnetic powder in the direction of the easily-magnetizable axes, under a condition where the residual amount of the solvent in the coated solvent-solution for the upper magnetic layer is within a range of 40% to 100% by weight, more preferably 50 to 100% by weight of the amount of the solvent contained in the original solvent-solution for the upper magnetic layer to be coated on the support. Then, oblique orientation is performed by an oblique orientation apparatus 28 in the condition in which the amount of solvent is adjusted to be 40 to 80%, more preferably 40% to 60% by a drier 27. The intensity of magnetic field to be applied when the oblique orientation or perpendicular orientation with respect to the surface of the support thus described is within a range of 50% to 600%, more preferably 100% to 400% of the magnetic force of the magnetic powders contained in the upper magnetic layer in the direction of the easily-magnetizable axes. Then, after final drying by a second drying apparatus 30 and calendaring by a calendaring apparatus 29, the resulting support is taken up by a takeup roll 21b.

By defining the residual amount (as determined by the drying rate) of the solvent at the time of oblique orientation (inclusive of perpendicular orientation) as described above, magnetic particles are prevented from moving excessively when the magnetic particles are rotated at the time of oblique orientation in accordance with the suitable viscosity of the magnetic layer. As a result, aggregation of the magnetic particles can be avoided.

Further, by setting the timing of oblique orientation so that oblique orientation is performed in the condition in which the residual amount of the solvent is in a specific range, not only is the size of the orientation region prevented from becoming larger than necessary but the degree of freedom of orientation return caused by the inverted magnetic field of the magnetic substance after orientation is reduced. As a result, the arrangement of the magnetic fine particles based on orientation can be reserved effectively.

Examples of the coating layer structure in the embodiment can include: a two-layer structure of an upper magnetic layer 23c and a lower layer (23b) mainly containing inorganic powder, resin and solvent; a three-layer structure of an upper magnetic layer/an intermediate layer mainly containing resin/a lower layer (23a, 23b) mainly containing inorganic powder, resin and solvent; and so on. The upper magnetic layer is formed so as to be thinner than the lower layer. Particularly, the thickness of the upper magnetic layer preferably is from 0.1 to 1 µm. The upper layer may contain abrasives. Further, the thickness of the nonmagnetic lower layer may preferably be selected from a range of 0.5 to 3 µm.

In the case of those examples, the inorganic powder contained in the lower layer plays a role of maintaining tape stiffness required at head touch or the like. Further, the surface characteristic of the magnetic layer can be controlled in accordance with the grain shape, size and quantity of the inorganic powder. Particularly, by providing the inorganic powder in the form of fine particles, a super-smooth surface necessary for high-density recording can be obtained.

Further, the lower layer which mainly contains the inorganic powder, resin and solvent functions as a cushion layer when the upper magnetic layer is subjected to high-filling and surface-smoothening treatment in a calendaring process after coating and drying. As the inorganic powder, carbon black preferably is contained for antistatic purposes as well as for the purpose of controlling the shear rate-viscosity characteristic of the lower layer liquid.

As for the "lower layer mainly containing inorganic powder, resin and solvent" herein used, the total amount of the inorganic powder component, inclusive of carbon black and the resin component, preferably is not less than 50%, more preferably not less than 70% by weight, with respect to the total solid component of the coating composition, except the volatile component thereof. When adaptability for high-frequency recording is considered, it is necessary that layers except for the upper magnetic layer are substantially nonmagnetic. In the case where such layers contain magnetic particles, it is necessary that the kind and quantity of the magnetic particles are selected so that the magnetic flux density of the lower layer singly is not larger than 500 gauss.

As the needle-shaped or granular magnetic powder in the upper layer for recording, known needle-shaped or granular particles such as ferromagnetic alloy fine powder mainly containing γ-Fe2Ox (x=1.33 to 1.5), Co-modified γ-FeOx (x=1.33 to 1.5), Fe, Ni or Co, may be used. The magnetic powder having an acicular ratio selected to be in a range of from 3 to 20 can be used.

As the plate-like magnetic powder having an axis of easy magnetization perpendicular to its plate surface, a magnetic powder of hexagonal-system magnetoplumbite ferrite, such as barium ferrite, a magnetic powder of a hexagonal-system alloy containing Co as a main component and including another metal, and so on, may be used.

The kinds of ferromagnetic powder may contain Al, Si, etc. as other predetermined elements and may be pre-treated with a dispersing agent, a lubricating agent, a surface active agent, an antistatic agent, etc. Because the upper layer must be filled with ferromagnetic powder as sufficiently as possible to attain high-density recording, the quantity of additives such as resins, abrasives, lubricants, etc. contained in the upper layer liquid should be minimized.

The intermediate layer mainly containing resin is a coating layer of a high-density liquid having a static viscosity of not lower than 20 cp. Because the intermediate layer has such high viscosity, the intermediate layer fulfills the double role of preventing disturbances at the interface on the lower side of the upper magnetic layer in the coating, orientation and drying processes, and fixing the ferromagnetic powder contained in the upper layer at the time of oblique orientation.

The "intermediate layer mainly containing resin" herein used represents a layer in which the amount of the resin component is not less than 50% with respect to the total solid component of the coating composition except the volatile component thereof. The intermediate layer may contain lubricants and inorganic powder, inclusive of carbon black, as components other than the resin component. It is unnecessary to make the intermediate layer thicker so long as the aforementioned function is satisfied. That is, the thickness of the intermediate layer is selected to be preferably not greater than 1 µm, more preferably not greater than 0.5 µm.

Selecting the thickness of the upper magnetic layer to be preferably not greater than 1 µm, more preferably not greater than 0.5 µm as dried film thickness is very important for attaining a high degree of oblique or perpendicular orientation. It is believed the thin magnetic layer is required because the degree of freedom of orientation return caused by the inverted magnetic field of magnetization following field orientation is reduced.

In the case where the thin upper magnetic layer is formed singly, it is preferable that respective layers are applied sequentially or simultaneously in the condition in which the respective layers are wet. To apply such multiple layers evenly without any fault, the following extrusion coating apparatus can be used.

For example, two or more single-layer-purpose support pressing-type extrusion coating apparatus as described in U.S. Pat. Nos. 4,424,762, 4,480,583 and 4,681,062, Japanese Patent Unexamined Publication Nos. Sho-58-109162 and Hei-2-265672, and so on, are arranged so that two or more layers are applied in the condition in which the respective layers are wet.

Alternatively, simultaneous two-layer application support pressing extrusion coating apparatus as described in U.S. Pat. Nos. 4,854,262, 5,030,484 and 5,072,688, Japanese Patent Unexamined Publication Nos. Sho-58-109162 and Hei-2-265672, and so on, may be used. In the case of a three-layer application, two layers other than the upper magnetic layer are applied by the apparatus whereas the upper magnetic layer is applied by the aforementioned single-layer-purpose support pressing-type extrusion coating apparatus.

In a known support pressing-type extrusion coating apparatus shown as the aforementioned single-layer-purpose support pressing type extrusion coating apparatus, three pockets and three slits may be provided in the inside of the apparatus to apply three layers simultaneously (the coating apparatus 24 in FIG. 1 is an equivalent).

Further, after the lower layer is applied by an extrusion coating apparatus including gravure coating, roll coating and blade coating backup rolls as used generally for coating a flexible support, the upper layer or the upper and intermediate layers may be formed by the aforementioned various kinds of coating apparatus.

Further, as described in Japanese Patent Unexamined Publication Nos. Sho-63-20069 and Hei-4-4071, the plurality of layers inclusive of the upper magnetic layer may be applied by an extrusion coating apparatus after air carried by the support is cut off by a low-viscosity liquid mainly containing solvent. In that case, the plurality of layers inclusive of the upper magnetic layer may be applied simultaneously by a single head having a plurality of pockets and a plurality of slits inside thereof or may be applied sequentially by a plurality of heads in the condition in which the respective layers are wet. As the low-viscosity liquid mainly containing solvent, an undercoating composition may be used.

To prevent aggregation of particles in a coating composition containing a magnetic substance, it is preferable to shear the coating composition in the inside of the coating apparatus by a method as disclosed in U.S. Pat. No. 4,828,779.

Figure 2:
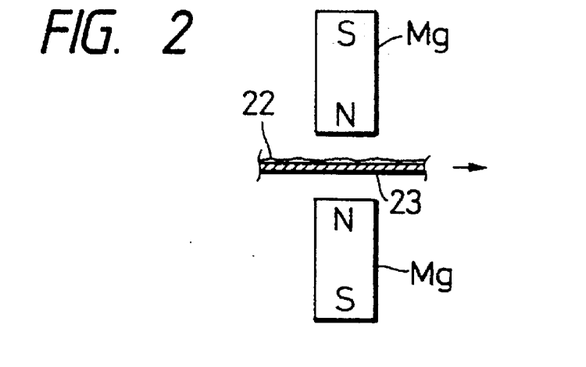
FIG. 2 is a schematic view of another lengthwise orientation apparatus used according to the instant invention.
Figure 3:
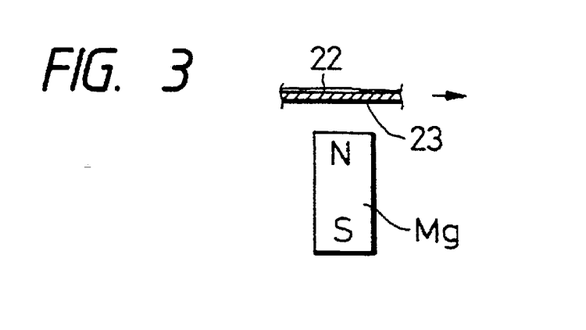
FIG. 3 is a schematic view of another lengthwise orientation apparatus used according to the instant invention.
Figure 11:
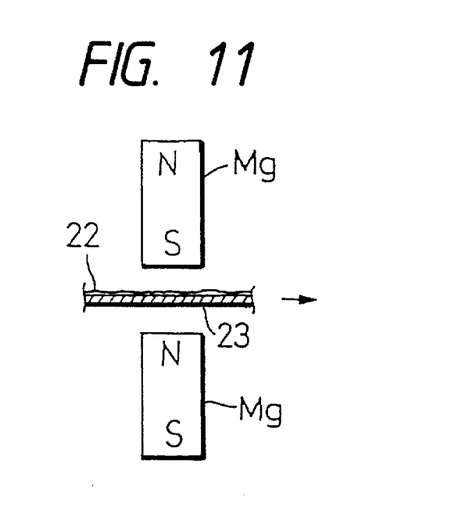
FIG. 11 shows a vertical orientation apparatus applicable to the instant invention.

As the lengthwise orientation apparatus 26 in FIG. 1, a known orientation apparatus may be used. Examples of the apparatus include: a structure in which a pair of homopolar-opposition magnets Mg are disposed so as to be opposite to each other from the front and back sides of the support 22 as shown in FIG. 2; a single-pole magnet Mg or solenoid coil as shown in FIG. 3; and an arbitrary combination thereof. Further, as shown in FIG. 11, a couple of magnets Mg may be arranged vertically in such a manner that different poles face each other with respect to the support 22.

Figure 4:
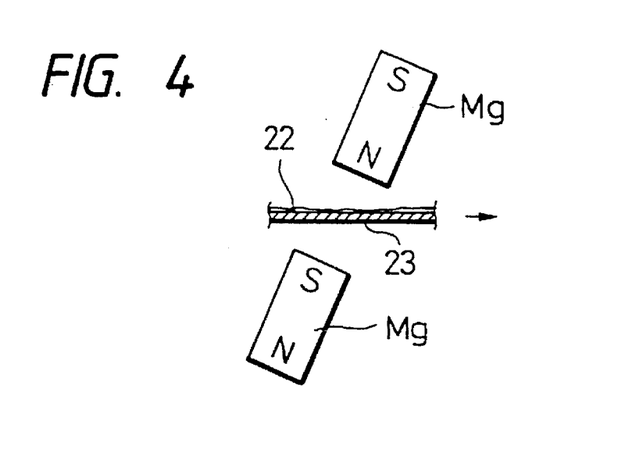
FIG. 4 shows an oblique orientation apparatus used according to the instant invention.

As the oblique orientation apparatus 28, an oblique magnetic field generator using heteropolar-opposition magnets Mg or solenoid coils as shown in FIG. 4 or using a plurality of solenoid coils as described in Japanese Patent Unexamined Publication No. Hei-3-35420, may be used. Alternatively, another known oblique or perpendicular orientation apparatus may be used.

The drier 27 disposed in the back of the preparatory lengthwise orientation apparatus 26 is provided to adjust the solvent drying rate in the wet-state coating layer 23. The drier 27 is, for example, a heated-air drier which adjusts the temperature of heated air to control the quantity of the solvent residue in the coating layer to thereby set the solvent drying rate to a predetermined value.

In the instant invention, the solvent residual rate of the solvent at an inlet of the preparatory lengthwise orientation apparatus 26 is not limited specially but the solvent residual rate at an inlet of the oblique orientation apparatus 28 and the solvent residual rate at an outlet thereof are limited to be not greater than 80% and not smaller than 40%, respectively. That is, the solvent residual rate of the solvent at the time of oblique orientation is selected so that the amount of solvent is 40 to 80%. By that limitation, good orientation in which magnetic fine particles in the magnetic layer are arranged substantially in the direction of a predetermined angle very effectively can be obtained.

Specific examples of the inorganic powder used according to the present invention include a powder of inorganic compounds such as metal oxides, metal carbonates, metal sulfates, metal nitrates, metal carbides, metal sulfides, etc. Examples of the inorganic compounds used singly or in combination include α-alumina having an alphatizing ratio of not smaller than 90%, β-alumina, γ-alumina, silicon carbide, chromium oxide, cerium oxide, α-iron oxide, corundum, silicon nitride, titanium carbide, titanium oxide, silicon dioxide, tin oxide, tungsten oxide, zirconium oxide, boron nitride, zinc oxide, calcium carbonate, calcium sulfate, barium sulfate, molybdenum disulfide, etc.

Specific examples of the inorganic powder used according to the present invention include: AKP-20, AKP-30, AKP-50, HIT-50 and HIT-100 made by Sumitomo Chemical Co., Ltd.; G5, G7 and S-1 made by Nippon Chemical Industrial Co., Ltd.; TF-100, TF-120 and TF-140 made by Toda Kogyo Corp.; TTO-55, FT-1000, FT-2000, FTL-100, FTL-200, M-1, S-1 and SN-100 made by Ishihara Sangyo Kaisha Ltd.; ECT-52, STT-4D, STT-30, STT-65C, Y-LOP and α-hematite produced from Y-LOP made by Titan Kogyo K. K.; T-1 made by Mitsubishi Metal Mining Co., Ltd.; NS-0, NS-3Y and NS-BY made by Japan Catalytic Chemical Industry Co., Ltd.; and so on.

Examples of the carbon black used in the coating composition according to the instant invention include rubber-purpose furnace black, rubber-purpose thermal black, color-purpose black, acetylene black, and so on.

Specific examples of the carbon black used in the non-magnetic layer according to the instant invention include: BLACKPEARLS 2000, 1300, 1000, 900, 800, 880 and 700 and VULCAN XC-72 made by Cabot Specialty Chemicals Industries Co., Ltd.; #3250B, #950, #650B, #970B and #850B made by Mitsubishi Chemical Industries Co., Ltd.; CONDUCTEX SC, RAVEN 8800, 8000, 7000, 5750, 5250, 3500, 2100, 2000, 1800, 1500, 1255 and 1250 made by Columbia Carbon Japan, Ltd.; KATJEN BLACK EC made by Akzo Corp.; and so on.

Before the carbon black is used, the carbon black may be surface-treated with a dispersing agent or the like, or may be graphitized with a resin or the surface of the carbon black may be partly graphitized. Further, before the carbon black is added to magnetic paint, the carbon black may be dispersed by a binder. The kinds of carbon black may be used singly or in combination. For example, the carbon black used according to the present invention can be based on "Carbon Black Handbook" (edited by Carbon Black Association).

Examples of resin as the binder used in the coating composition for the lower non-magnetic layer, the intermediate layer or the upper magnetic layer according to the instant invention include known thermoplastic resins, thermosetting resins, reaction-type resins, such as electron-setting resins and ultraviolet-setting resins, and mixtures thereof. As for the thermoplastic resins, the glass transition point is selected to be in a range of from −100 to 150° C., the average molecular weight is selected to be in a range of from 1,000 to 200,000, preferably in a range of from 10,000 to 100,000, and the degree of polymerization is selected to be in a range of about 50 to about 1000.

Examples of the thermoplastic resins having the aforementioned properties include: polymers or copolymers having, as constituent units, vinyl chloride, vinyl acetate, vinyl alcohol, a maleic acid, an acrylic acid, acrylic ester, vinylidene chloride, acrylonitrile, a methacrylic acid, methacrylic ester, styrene, butadiene, ethylene, vinyl butyral, vinyl acetal, vinyl ether, etc.; polyurethane resins; and various kinds of rubber resins.

Examples of the thermosetting or reaction-type resins include: phenol resins; epoxy resins; polyurethane setting-type resins; urea resins; melamine resins; alkyd resins; acrylic reaction resins; formaldehyde resins; polycyanate resins; silicone resins; epoxy-polyamide resins; mixtures of polyester resins and isocyanate prepolymers; mixtures of polyester polyol and polyisocyanate; mixtures of polyurethane and polyisocyanate; and so on.

The resins are described in detail in "Plastic Handbook" published by Asakura Shoten. Further, known electron-setting resins may be used. Examples of those resins and the methods for producing those resins are described in detail in Japanese Patent Unexamined Publication No. Sho-62-256219. The aforementioned resins may be used singly or in combination but the preferred resin is a combination of polyurethane resin and at least one member selected from the group of vinyl chloride resin, vinyl chloride-vinyl acetate resin, vinyl chloride-vinyl acetate-vinyl alcohol resin and vinyl chloride-vinyl acetate-maleic anhydride copolymer, or a combination of polyisocyanate and at least one member selected from the aforementioned group.

With respect to the structure of the polyurethane resin, known structures of polyester polyurethane, polyether polyurethane, polyether polyester polyurethane, polycarbonate polyurethane, polyester polycarbonate polyurethane, polycaprolactone polyurethane, and so on may be used.

As for the binders described above, if necessary to attain more excellent dispersing property and durability, it is preferable to use binders obtained by introducing at least one polar group selected from COOM, $SO_3M$, $OSO_3M$, $P=O(OM)_2$, $O-P=O(OM)_2$ (in which M represents a hydrogen atom or an alkali metal base), OH, $NR^2$, $N^+R^3$ (in which R represents a hydrogen carbide group), an epoxy group, SH, CN, and so on, by copolymerization or addition reaction. The amount of the polar group is selected to be in a range of from $10^{-1}$ to $10^{-3}$ mol/g, preferably in a range of from $10^{-2}$ to $10^{-5}$ mol/g.

Specific examples of binders that can be used according to the instant invention include: VAGH, VYHH, VMCH, VAGF, VAGD, VROH, VYES, VYNC, VMCC, XYHL, XYSG, PKHH, PKHJ, PKHC and PKFE made by Union Carbide Corp.; MPR-TA, MPR-TA5, MPR-TAL, MPR-TSN, MPR-TMF, MPR-TS and MPR-TM made by Nissin Chemical Industry Co., Ltd.; 1000W, DX80, DX81, DX82 and DX83 made by Denki Kagaku Kogyo K.K.; MR110, MR100 and 400X110A made by Nippon Zeon Co., Ltd.; NIPPOLLAN N2301, N2302 and N2304 made by Nippon Polyurethane Industry Co., Ltd.; Pandex T-5105, T-R3080, T-5201, BURNOCK D-400, D-210-80, CRISVON 6109 and 7209 made by Dai Nippon Ink & Chemicals, Inc.; BYLON UR8200, UR8300, RV530 and RV 280 made by Toyobo Co., Ltd.; DIFERAMIN 4020, 5020, 5100, 5300, 9020, 9022 and 7020 made by Dainichiseika Color & Chemicals Mfg. Co., Ltd.; MX5004 made by Mitsubishi Chemical Industries Ltd.; SANPRENE SP-150 made by Sanyo Chemical Industries Ltd.; and SARAN F310 and F210 made by Asahi Chemical Industry Co., Ltd; and so on.

The binder used in the upper magnetic layer according to the instant invention is used in a range of 5 to 50% by weight, preferably in a range of 10 to 30% by weight, with respect to the magnetic powder. In the case where vinyl chloride resin is used as the binder, the binder is used in a range of 5 to 30% by weight. In the case where polyurethane resin is used as the binder, the binder is used in a range of 2 to 20% by weight. In the case where polyisocyanate is used as the binder, the binder is used in a range of 2 to 20% by weight. The binders preferably are used in combination in the aforementioned ranges.

In the case where polyurethane is used according to the instant invention, it is preferable to use polyurethane having a glass transition point of −50° to 100° C., a rupture expansion of 100 to 2,000%, a rupture stress of from 0.05 to 10 kg/cm$^2$ and a yield point of 0.05 to 10 kg/cm$^2$. The quantity of the binder in the magnetic recording medium according to the instant invention, the quantities of vinyl chloride resin, polyurethane resin, polyisocyanate and other resins in the binder, the molecular weight of each resin constituting the magnetic layer, the quantity of the polar group, the physical properties of the aforementioned resins, and so on, may be varied in accordance with the respective layers, if necessary.

Examples of the polyisocyanate used according to the instant invention include: isocyanates, such as tolylenediisocyanate, 4-4'-diphenylmethanediisocyanate, hexamethylenediisocyanate, xylylenediisocyanate, naphthylene-1,5-diisocyanate, ortho-toluic diisocyanate, isophoronediisocyanate, triphenylmethane-triisocyanate, and so on; products of the isocyanates and polyalcohol; polyisocyanates produced by condensation of the isocyanates; and so on.

Examples of the tradenames of the isocyanates on the market include: CORONATE L, CORONATE HL, CORONATE 2030, CORONATE 2031, MILLIONATE MR and MILLIONATE MTL made by Nippon Polyurethane Industry Co., Ltd.; TAKENATE D-102, TAKENATE D-110N, TAKENATE D-200 and TAKENATE D-202 made by Takeda Chemical Industries Ltd.; and DESMODUR L, DESMODUR IL, DESMODUR N and DESMODUR HL made by Sumitomo-Bayer Urethane Co., Ltd. The polymers may be used both in the lower non-magnetic layer and in the upper recording layer singly or in combination of two or more by using difference in hardening reaction.

Examples of the carbon black used in the upper magnetic recording layer, that is, in the magnetic layer, according to the instant invention, include rubber-purpose furnace black, rubber-purpose thermal black, color-purpose black, acetylene black, and so on. Carbon black with a specific area of 5 to 500 $m^2/g$, with dibutylphthalate (DBP) oil absorption of 10 ml/100 g to 400 ml/100 g, with a particle size of 5 μm to 300 μm, with a pH of 2 to 10, with a water content of 0.1 to 10% and with a tap density of 0.1 to 1 g/cc is used preferably. Specific examples of the carbon black used according to the instant invention include: BLACKPEARLS 2000, 1300, 1000, 900, 800, 700 and VULCAN XC-72 made by Cabot Specialty Chemicals Inc.; #80, #60, #55, #50 and #35 made by Asahi Carbon Co., Ltd.; #2400B, #2300, #900, #1000, #30, #40 and #10B made by Mitsubishi Chemical Industries Ltd.; and CONDUCTEX SC, RAVEN 150, 50, 40 and 15 made by Columbia Carbon Corp.

Carbon black having a surface treated with dispersing agents, carbon black graphitized with resin or carbon black having a partly graphitized surface may be used. Carbon black may be dispersed preliminarily with a binder before it is added to the magnetic paint. The kinds of carbon black may be used singly or in combination.

In the case where carbon black is used, preferably it is used in an amount of 0.1 to 30% with respect to the amount of the ferromagnetic powder.

Carbon black functions to prevent electrification of the magnetic layer, reduce the friction coefficient, adds shading characteristics, improves film strength, and so on.

The functions vary according to the kind of the carbon black used. Accordingly, it is a matter of course that the kind of carbon black used according to the instant invention corresponds to the desired purpose based on the aforementioned characteristics, such as particle size, oil absorption, electrical conductivity, pH and so on. The desired characteristic can be obtained based on the kind, quantity and combination of carbon black types in each of the first and second layers, that is, the lower non-recording layer and the upper recording layer. For example, electrification can be prevented by using an electrically high conductive carbon black in the lower layer and, on the other hand, the friction coefficient can be reduced by using carbon black of large particle size in the upper recording layer. A suitable carbon black can be determined by reference to "Carbon Black Handbook" (edited by the Carbon Black Association).

As the abrasives used in the upper recording layer according to the instant invention, known materials having a hardness of not less than 6 in the Mohs scale, such as α-alumina with an alphatizing ratio of not less than 90%, β-alumina, silicon carbide, chromium oxide, cerium oxide, m-iron oxide, corundum, artificial diamond, silicon nitride, silicon carbide, titanium carbide, titanium oxide, silicon dioxide, boron nitride, and so on, are used mainly singly or in combination. Composite materials formed of the abrasives (by surface-treating an abrasive material with another abrasive material) may be used. The abrasives may contain other compounds or elements in addition to the main components, but the same effect can be achieved if the main components comprise 90% or more of the abrasive.

The mean particle size of the abrasives is preferably 0.01 to 2 μm, but the same effect can be obtained when using abrasives of different particle size than that noted hereinabove in combination, if necessary, or when the particle size distribution is broadened, even in the case where one abrasive material is used singly. Abrasives with the tap density of 0.3 to 2 g/cc, with a water content of 0.1 to 5%, with a pH of 2 to 11 and with a specific area of 1 to 30 $m^2/g$ are used preferably. Abrasives with a needle shape, ball shape or cube shape may be used, but abrasives which are partly angularly shaped are preferable because of excellent abrasive characteristics.

Specific examples of the abrasives used according to the instant invention include: AKP-20, AKP-30, AKP-50 and HIT-50 made by Sumitomo Chemical Co., Ltd.; G5, G7 and S-1 made by Nippon Chemical Industrial Co., Ltd.; 100ED and 140ED made by Toda Kogyo Corp; and so on. It is a matter of course that the abrasives used according to the instant invention can be selected on the basis of the desired purpose by varying the kind, quantity and combination of abrasives in each of the layers. The abrasives may be added to the magnetic paint after being preliminarily dispersed with a binder. The number of abrasive particles present at the upper recording layer surface and upper recording end surface of the magnetic recording medium according to the instant invention preferably is 5 to 100 per 100 $μm^2$.

Additives having lubricating effects, antistatic effects, dispersing effects, plastic effects, and so on, can be used. Examples of the additives include molybdenum disulfide, tungsten disulfide, graphite, boron nitride, black coal fluoride, silicone oil, silicone having a polar group, fatty acid modified silicone, fluorine-containing silicone, fluorine-containing alcohol, fluorine-containing ester, polyolefin, polyglycol, alkyl phosphoric ester and alkali metal salt thereof, alkyl sulfuric ester and alkali metal salt thereof, polyphenyl ester, fluorine-containing alkyl sulfuric ester and alkali metal salt thereof, monobasic fatty acids (which may contain an unsaturated bond or may have a branch connection) having 10 carbon atoms to 24 carbon atoms, and metal salts thereof (such as Li, Na, K, Cu, and so on), monohydric, dihydric, trihydric, tetrahydric, pentahydric and hexahydric alcohols (which may contain an unsaturated bond or may have a branch connection) having 12 carbon atoms to 22 carbon atoms, alkoxy alcohols having 12 carbon atoms to 22 carbon atoms, mono-, di- or tri-fatty acid ester comprising monobasic fatty acid (which may contain an unsaturated bond or may have branch a connection) having 10 carbon atoms to 24 carbon atoms and at least one of monohydric, dihydric, trihydric, tetrahydric, pentahydric and hexahydric alcohols (which may contain an unsaturated bond or may have a branch connection) having 2 carbon atoms to 12 carbon atoms, fatty acid ester of monoalkyl ether of alkylene oxide polymer, fatty acid amide having 8 carbon atoms to 22 carbon atoms, aliphatic amine having 8 carbon atoms to 22 carbon atoms, and so on. Specific examples thereof include a lauric acid, a myristic acid, a palmitic acid, a stearic acid, a behenic acid, a butyl stearate, an oleic acid, a linolic acid, a linolenic acid, an elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, lauryl alcohol, and so on.

Further, nonionic surface active agents, such as alkylene oxide, glycerine, glycidol, alkylphenolethylene oxide addition product, and so on; cationic surface active agents, such as cyclic amine, ester amide, quanternary ammonium salts, derivatives of hydantoin, heterocyclic compounds, phosphonium or sulfonium compounds, and so on; anionic surface active agents, such as a carboxylic acid, a sulfonic acid, a phosphoric acid, a sulfuric ester group, a phosphoric ester group, and so on; and amphoteric surface active agents, such as amino acids, aminosulfonic acids, sulfuric or phosphoric esters of aminoalcohol, alkyl betaines, and so on, may be used. The surface active agents are described in "Surface Active Agent Handbook" (published by Sangyo Tosho Co., Ltd.).

The lubricants, antistatic agents, and so on, need not be of high purity and may contain impurities, such as isomers, unreacted residues, side reaction products, decomposed matters, oxides, and so on, in addition to the main components. The amount of the impurities preferably is not greater than 30%, and more preferably, not greater than 10%.

The lubricants and surface active agents used according to the instant invention can be varied as to the kind and quantity thereof in each of the layers, if necessary. For example, bleeding of the surface is controlled by using fatty acids of different melting point in the respective layers. Bleeding of the surface also is controlled by using esters of different boiling point or polarity. Although the stability of coating is improved by adjusting the quantity of the surface active agent and the lubricating effect is improved by increasing the amount of lubricant in the lower non-recording layer, it is a matter of course that the purpose and use thereof are not limited to the aforementioned examples.

All or part of the additives used according to the instant invention may be added at an arbitrary point in time of the magnetic medium producing process. For example, the instant invention can be applied to any of the circumstances where the additives may be mixed with a ferromagnetic powder before the kneading process, where the additives may be added in the process of kneading a ferromagnetic powder, binder and solvent, where the additives may be added after dispersion, where the additives may be added just before coating, and so Examples of lubricants (tradenames) used according to the instant invention include: NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Castor Hardening Fatty Acid, NAA-42, NAA-44, CATION SA, CATION MA, CATION AB, CATION BB, NYMEEN L-201, NYMEEN L-202, NYMEEN S-202, NONION E-208, NONION P-208, NONION S-207, NONION K-204, NONION NS-202, NONION NS-210, NONION HS-206, NONION L-2, NONION S-2, NONION S-4, NONION O-2, NONION LP-20R, NONION PP-40R, NONION SP-60R, NONION OP-80R, NONION OP-85R, NONION LT-221, NONION ST-221, NONION TO-221, MONOGLY MB, NONION DS-60, ANON BF, ANON LG, BUTYL STEARATE, BUTYL LAURATE and ERUCIC ACID made by Nippon Oils & Fats Co., Ltd.; OLEIC ACID made by Kanto Chemical Co., Inc.; FAL-205 and FAL-123 made by Takemoto Oil & Fat Co., Ltd.; N-JLUB LO, N-JLUB IPM and PLASTICIZERS E4030 made by New Japan Chemical Corp.; TA-3, KF-96, KF-96L, KF-96H, KF410, KF420, KF965, KF54, KF50, KF56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910 and KF-3935 made by Shin-etsu Chemical Industry Co., Ltd.; ARMIDE P, ARMIDE C and ARMOSLIP CP made by Lion-Armor Co., Ltd.; DUOMIN TDO made by Lion Fat & Oil Co., Ltd.; BA-41G made by Nisshin Oil Mills Ltd.; PROFAN 2012E, NEWPOLE PE61, IONET MS-400, IONET MO-200, IONET DL-200, IONET DS-300, IONET DS-1000 and IONET DO-200 made by Sanyo Chemical Industries Ltd.; and so on.

The organic solvents according to the instant invention can be used in any proportion. Examples of the organic solvents used include: ketones, such as acetone, methyl ethyl ketone, methyl isobutyl ketone, diisobutyl ketone, cyclohexanone, isophorone, tetrahydrofuran, and so on; alcohols, such as methanol, ethanol, propanol, butanol, isobutyl alcohol, isopropyl alcohol, methyl cyclohexanol, and so on; esters, such as methyl acetate, butyl acetate, isobutyl acetate, isopropyl acetate, ethyl lactate, glycol acetate, and so on; glycol ethers, such as glycol dimethyl ether, glycol monoethyl ether, dioxane, and so on; aromatic hydrocarbons, such as benzene, toluene, xylene, cresol, chlorobenzene, and so on; chlorinated hydrocarbons such as methylene chloride, ethylene chloride, carbon tetrachloride, chloroform, ethylene chlorohydrin, dichlorobenzene, and so on; N,N-dimethyl formamide; and hexane.

The organic solvents do not need to be perfectly pure and may contain impurities, such as isomers, unreacted residues, side reaction products, decomposed matters, oxides, water, and so on, in addition to the main components. The amount of the impurities preferably is not greater than 30%, and more preferably, not greater than 10%.

The organic solvents used according to the instant invention can be selected as to the kind and quantity thereof in each of the layers, if necessary. Improvement of surface characteristics by using a high-volatile solvent in the lower layer, improvement in stability of coating by using a high surface tension solvent (such as cyclohexane, dioxane, and so on) in a relatively lower layer, improvement in the degree of filling by using a solvent high in dissolving parameter in the upper recording layer, and so on, are considered examples of the selection, but it is a matter of course that the purpose and use thereof are not limited to the aforementioned examples.

A backcoat layer may be provided on the non-magnetic support 22 on a side opposite to the side on which the magnetic layer is found. The thickness of the backcoat layer is 0.1 to 2 µm, and preferably, 0.3 to 1.0 µm. The undercoat and backcoat layers may be made of any conventional and suitable material.

The non-magnetic support used according to the instant invention may comprise known films formed of polyesters, such as polyethylene terephthalate, polyethylene naphthalate, and so on; polyolefins, cellulose triacetate, polycarbonate, polyamide, polyimide, polyamide-imide, polysulfone, aramide, aromatic polyamide, and so on. The supports may be subjected preliminarily to corona discharge treatment, plasma treatment, liquid adhesion treatment, thermal treatment, dust collection treatment, and so on.

It is preferred that materials with a center line average surface roughness of not greater than 0.03 μm, and preferably, not greater than 0.02 μm, and more preferably, not greater than 0.01 μm, are used as the non-magnetic supports. Furthermore, it is preferable that not only the non-magnetic supports have a small amount of center line average surface roughness but the non-magnetic supports but also have no rough projection of 1 μm or greater. The rough form of the surface can be controlled freely by the size and quantity of fillers added to the supports as occasion demands. Examples of the fillers include: oxides of Ca, Si, Ti, etc.; carbonates thereof; organic fine powder of acrylic compounds, etc.

The thermal shrinkage percentage of the non-magnetic support in the direction of the travel of the support and in the direction of the width of support at 100° C. for 30 minutes is preferably not greater than 3%, and more preferably not greater than 1.5%. The thermal shrinkage percentage at 80° C. for 30 minutes is preferably not greater than 1%, and more preferably not greater than 0.5%. It is preferable that the shear strength and elastic modulus thereof are respectively within a range of 5 to 100 kg/mm$^2$ and within a range of from 100 to 2000 kg/mm$^2$ in the two directions.

The process for producing magnetic layer for the magnetic recording medium according to the instant invention includes a kneading process, a dispersing process, and a mixing process provided before and after the processes as occasion demands. Each of the processes may be separated into two or more steps. The raw materials, such as ferromagnetic powder, binder, carbon black, abrasive agent, antistatic agent, lubricant, solvent, and so on, used according to the instant invention may be added at the beginning of any one of the processes or in the middle thereof. Each of the raw materials may be separated into groups to be added separately in two or more processes. For example, polyurethane may be separated into groups to be added separately in the kneading process, the dispersing process and the mixing process for adjusting viscosity after dispersion.

It is a matter of course that known producing techniques can be used as a part of the process, but high Br (residual magnetic flux density) of the magnetic recording medium according to the instant invention can be obtained by using a strong kneader, such as a continuous kneader or a pressure kneader, in the kneading process. In the case where the continuous kneader or pressure kneader is used, ferromagnetic powder and all or part (preferably, 30% or more with respect to the whole binder) of the binder are kneaded within a range of 15 parts to 500 parts per 100 parts of ferromagnetic powder. The details of a kneading process is described, for example, in U.S. Pat. No. 4,946,615 and Japanese Patent Unexamined publication No. Sho-64-79274.

Furthermore, a plastic roll of heat-resistant resin such as epoxy, polyimide, polyamide, polyimide-amide, and so on, may be used as the calendering roll. Alternatively, a metal roll may be used for the calendering process.

The treating temperature is preferably not lower than 70° C., and more preferably not lower than 80° C.

The linear pressure is preferably not smaller than 200 kg/cm, more preferably not less than 300 kg/cm.

The speed thereof is within a range of 20 m/minute to 700 m/minute.

The friction coefficient between the upper recording layer of the medium and the opposite surface of the magnetic recording medium according to the instant invention, against stainless steel, JIS SUS420J, is preferably not greater than 0.5, more preferably not greater than 0.3. The surface intrinsic resistivity is preferably within a range of $10^{-5}$ to $10^{-12}$ m/sq. The elastic modulus at expansion of the upper recording layer of 0.5% is preferably within a range of 100 to 2000 kg/mm$^2$ both in the direction of travel and across the width. The shear strength is preferably within a range of 1 to 30 kg/cm$^2$. The elastic modulus of the magnetic recording medium is preferably within a range of 100 to 1500 kg/mm$^2$ both in the direction of travel and across the width. The residual expansion is preferably not greater than 0.5%. The thermal shrinkage percentage at any temperature not higher than 100° C. preferably is not greater than 1%, more preferably not greater than 0.5%, most preferably not larger than 0.1%.

The amount of residual solvent contained in the upper recording layer preferably is not greater than 100 mg/m$^2$, and more preferably not greater than 10 mg/m$^2$. It is preferable that the amount of residual solvent contained in the upper recording layer be smaller than the amount of residual solvent in the intermediate layer.

Spaces produced by gas such as air, nitrogen gas or the like are generated unavoidably between particles such as magnetic powders, abrasive particles, etc. and binder resin, and such spaces are so called as voids. The percentage of voids contained in each of the layers is preferably not greater than 30% by volume, and more preferably not greater than 10% by volume.

The apparatus for carrying out the producing method according to the present instant invention can be altered according to how the medium of the instant invention is configured.

As described above, according to the instant invention, by defining the residual amount (drying rate) of the solvent at the time of oblique orientation (inclusive of perpendicular orientation), magnetic particles are prevented from excessive movement when the magnetic particles are rotated at the time of oblique orientation in accordance with the suitable viscosity of the magnetic layer. As a result, aggregation of the magnetic particles is avoided.

Further, by setting the timing of oblique orientation so that oblique orientation occurs when the residual amount of the solvent is in a specific range, not only is the size of the orientation region controlled and prevented from expanding unnecessarily but the degree of freedom of orientation return caused by the inverted magnetic field of the magnetic substance after magnetic field orientation is reduced. As a result, the arrangement of the magnetic fine particles based on orientation can be controlled effectively. Consequently, there is provided a recording medium adapted to high-density recording, in which the magnetic fine particles in a wet-state magnetic layer can be subjected to oblique orientation effectively without aggregation.

Various embodiments and results of the instant invention will become clearer from the following non-limiting examples of the instant invention.

EXAMPLES

RREFERENCE EXAMPLE

In a ball mill, components of each of the following coating compositions were mixed and dispersed for 10.5 hours to prepare coating compositions A, B, C and D shown in Tables A to D hereinbelow.

| Coating Composition A | |
|---|---|
| (Components) | |
| Fe/Zn/Ni (weight proportion 92:4:4) powder (needle-shaped particles of average grain size in the direction of length: 0.20 μm, length/width ratio: 10, coercive force: 1600 oersted) | 300 parts by weight |
| vinyl chloride-vinyl acetate copolymer (copolymerization ratio: 87:13, polymerization degree: 400) | 30 parts by weight |
| conductive carbon | 20 parts by weight |
| polyamide resin | 15 parts by weight |
| lecithin | 6 parts by weight |
| silicone oil (dimethyl polysiloxane) | 3 parts by weight |
| cyclohexanone | 300 parts by weight |
| methyl ethyl ketone | 300 parts by weight |
| n-butanol | 100 parts by weight |

As a result of measurement, the viscosity of the aforementioned coating composition A was 0.9 poise at a shear rate of $5 \times 10^2 \text{ sec}^{-1}$.

| Coating Composition B | |
|---|---|
| (Components) | |
| Fe/Zn/Ni (weight proportion 92:4:4) powder (needle-shaped particles of average grain size in the direction of length: 0.10 μm, length/width ratio: 6, coercive force: 1600 oersted) | 300 parts by weight |
| vinyl chloride-vinyl acetate copolymer (copolymerization ratio: 87:13, polymerization degree: 400) | 30 parts by weight |
| conductive carbon | 20 parts by weight |
| polyamide resin | 15 parts by weight |
| lecithin | 6 parts by weight |
| silicone oil (dimethyl polysiloxane) | 3 parts by weight |
| cyclohexanone | 300 parts by weight |
| methyl ethyl ketone | 300 parts by weight |
| n-butanol | 100 parts by weight |

As a result of measurement, the viscosity of the aforementioned coating composition B was 1.7 poise at a shear rate of $5 \times 10^{-2} \text{ sec}^{-1}$.

| Coating Composition C | |
|---|---|
| (Components) | |
| vinyl chloride-vinyl acetate copolymer (copolymerization ratio: 87:13, polymerization degree: 800) | 300 parts by weight |
| conductive carbon | 20 parts by weight |
| cyclohexanone | 100 parts by weight |
| methyl ethyl ketone | 50 parts by weight |
| n-butanol | 50 parts by weight |

As a result of measurement, the viscosity of the aforementioned coating composition D was 2.2 poise at a shear rate of $5 \times 10^2 \text{ sec}^{-1}$.

| Coating Composition D | |
|---|---|
| (Components) | |
| TiO$_2$ powder (average primary grain size: 0.05 μm, $S_{BET}$ value: 18 m$_2$/g) | 300 parts by weight |
| vinyl chloride-vinyl acetate copolymer (copolymerization ratio: 87:13, polymerization degree: 400) | 30 parts by weight |
| conductive carbon | 20 parts by weight |
| polyamide resin | 15 parts by weight |
| lecithin | 6 parts by weight |
| silicone oil (dimethyl polysiloxane) | 3 parts by weight |
| cyclohexanone | 500 parts by weight |
| n-butanol | 100 parts by weight |

As a result of measurement, the viscosity of the aforementioned coating composition D was 0.8 poise at a shear rate of $5 \times 10^2 \text{ sec}^{-1}$.

EXAMPLE 1

Coating compositions A and D were selected as upper and lower layers, respectively. After the two layers were applied by a simultaneous coating type support pressing extrusion coating apparatus (obtained by changing the coating apparatus of FIG. 1 to a two-layer type apparatus), drying orientation and calendering were carried out to prepare evaluation samples. The conditions for the production of the samples were as follows. (support condition)

Material: polyethylene terephthalate film

Thickness: 8 μm

Width: 300 mm

Tension: 15 kg/m

Running (coating) speed: 200 m/min

Apparatus for orientation in the direction of the running of the support:

Samarium-cobalt four-pole-opposed magnet of the type shown in FIG. 1. The maximum magnetic field intensity of the support running portion was 4500 (Oe).

Oblique orientation apparatus:

Samarium-cobalt two-pole-opposed magnet of the type shown in FIG. 1. The maximum magnetic field intensity of the support running portion was 5000 (Oe). The direction of the magnetic field and the direction of the running of the support formed an angle of 45° at that position.

Drying:

A heated-air drier 27 was disposed between a horizontal orientation apparatus 26 and an oblique orientation apparatus 28 with respect to the direction of the running of the support. The quantity of the solvent residue in the coating layer in the orientation apparatus 28 was changed by changing the temperature of heated air.

The thickness of the upper magnetic layer:

The thickness was changed in a dried film thickness range of 2.0 to 0.1 μm by changing the quantity of liquid to the coating apparatus.

The thickness of the lower layer:

2.0 μm as dried film thickness

The SQ (squareness of hysteresis curve) values in the direction of 45° of the various kinds of samples prepared in the conditions in Example 1 were obtained by measuring the degree of orientation at the magnetic field intensity of 5 kOe by using a vibrated sample type magnetometer (VSM) made by Toei Kogyo Co., Ltd.

Figure 5:
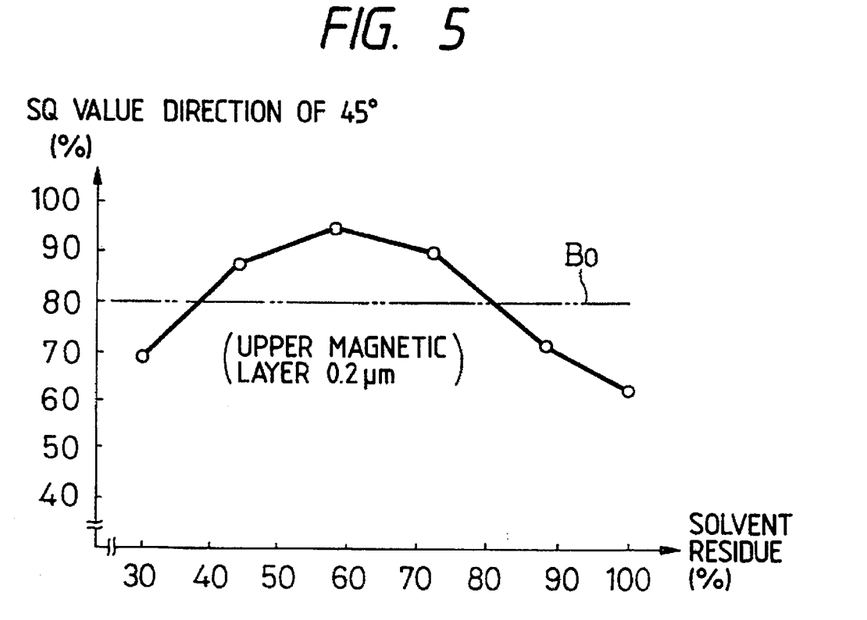
FIG. 5 is a graph showing the relationship between the SQ value and the quantity of the solvent residue in an embodiment of the instant invention.
Figure 6:
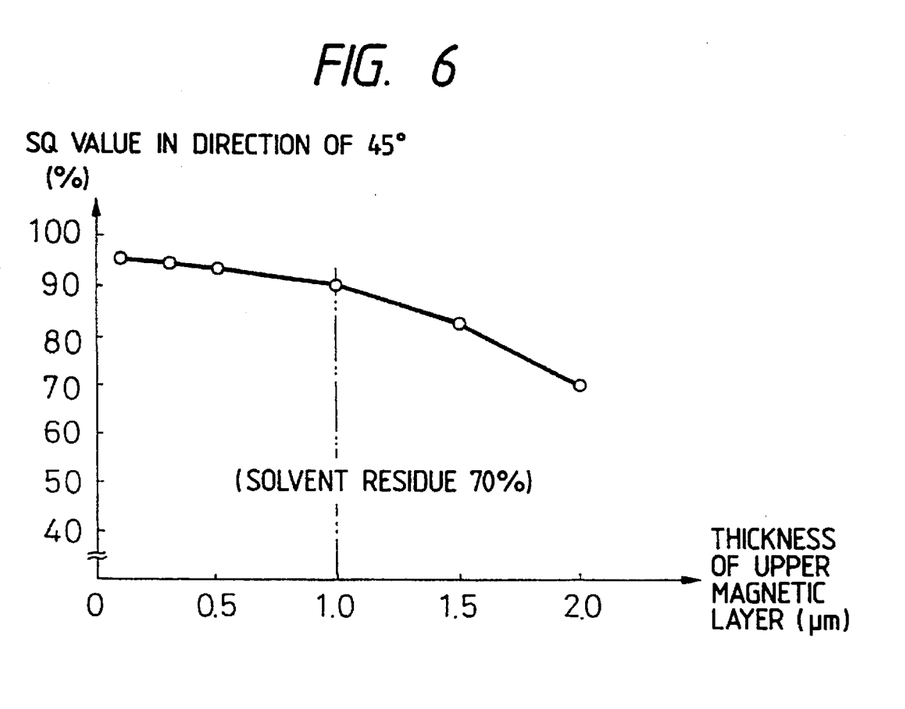
FIG. 6 is a graph showing the relationship between the SQ value and the thickness of the upper magnetic layer in an embodiment of the instant invention.

The influence of the quantity of the solvent residue at oblique orientation on the SQ value in the direction of 45° is shown in the graph of FIG. 5. The influence of the thickness of the upper magnetic layer in oblique orientation on the SQ value in the direction of 45° is shown in FIG. 6.

As shown in FIG. 5, it was apparent that there was an optimum SQ value as the quantity of the solvent residue varied in the oblique orientation procedure. A high degree of orientation was achieved by drying and vaporizing the solvent to obtain an amount of solvent residue at 40 to 80% (when the boundary line $B_0$ in which the SQ value was 80% was used as a reference line). As shown in FIG. 6, the SQ value in the direction of 45° was improved greatly with decrease of thickness of the upper magnetic layer. In the case where the upper magnetic layer had a thickness of about 1 µm, when the SQ value was about 90%, a good result was obtained.

EXAMPLE 2

Coating compositions B, C and D were selected as upper, intermediate and lower layers, respectively. After the three layers were applied by a simultaneous coating type support pressing extrusion coating apparatus (apparatus shown in FIG. 1), drying orientation and calendering were carried out to prepare evaluation samples. The conditions for the production of the samples was as follows.

The support was the same as in Example 1.

The orientation apparatus and drier were the same as in Example 1.

The thickness of the upper magnetic layer was changed from a dried film thickness of 2.0 to 0.1 µm by changing the quantity of liquid supplied by the coating apparatus.

The thickness of the intermediate layer was 0.2 µm as dried film thickness.

The thickness of the lower layer was 2.0 µm as dried film thickness.

Figure 7:
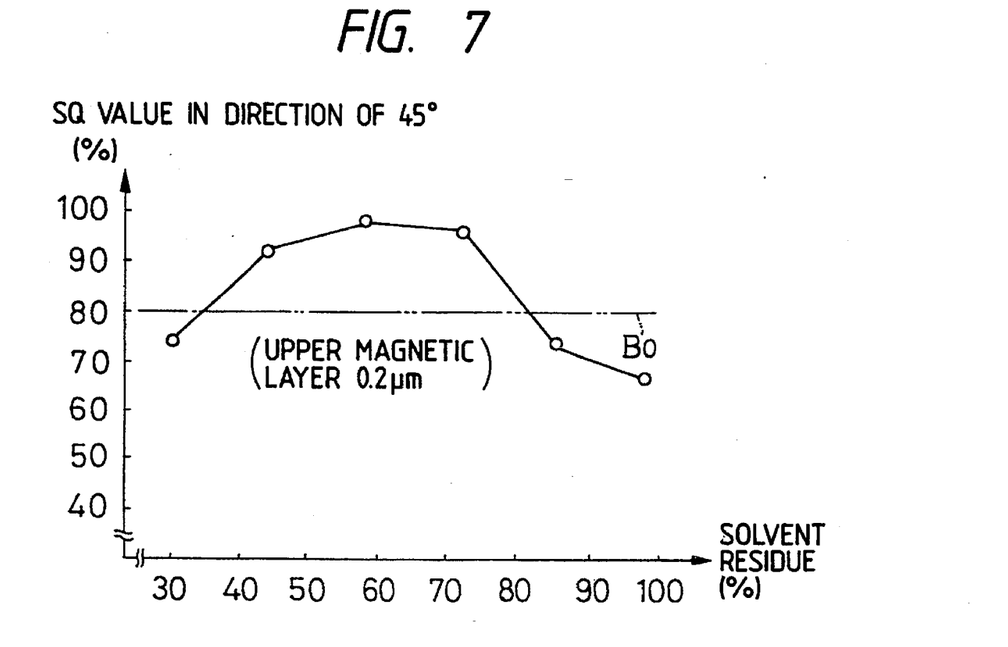
FIG. 7 is a graph showing the relationship between the SQ value and the quantity of the solvent residue in an embodiment of the instant invention.
Figure 8:
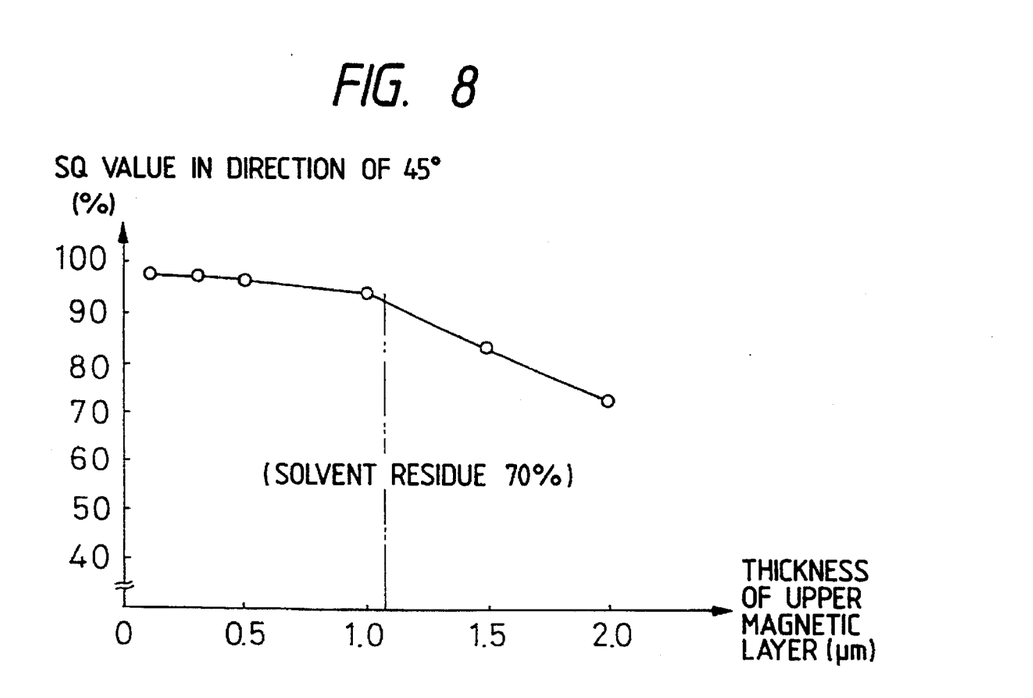
FIG. 8 is a graph showing the relationship between the SQ value and the thickness of the upper magnetic layer in an embodiment of the instant invention.

As in Example 1, and as shown in FIG. 7, the optimum range of the quantity of the solvent residue in oblique orientation was from 40 to 80%. As shown in FIG. 8, the SQ value in the direction of 45° was improved greatly with the decrease of the thickness of the upper magnetic layer in the same manner as in Example 1. In the case where the upper magnetic layer, had a thickness of about 1 µm and the SQ value was about to be 90%, a good result was obtained.

What is claimed is:

1. A method for producing a magnetic recording medium comprising a non-magnetic support having thereon, in order, a lower non-magnetic layer and an upper magnetic layer having a thickness of not greater than 1 µm when dry and containing magnetic powders, comprising the steps of, in order:

applying a solvent containing solution for the lower nonmagnetic layer and a solvent containing solution for the upper magnetic layer to the support sequentially or simultaneously to form solvent-solution layers thereon;

subjecting the magnetizable axes of the magnetic powders to a horizontal orientation;

subjecting the magnetizable axes of the magnetic powders to an oblique or perpendicular orientation while a residual amount of the solvent in the solvent containing solution layer for the upper magnetic layer is in a range from 40 to 80% by weight based on the total weight of the solvent in the solvent-solution for the upper magnetic layer; and drying the solvent containing solution layers.

2. A method of claim 1, wherein the thickness of the upper magnetic layer after the drying is 0.1 to 1 µm.

3. A method of claim 1, wherein the thickness of the lower non-magnetic layer after the drying is 0.5 to 3 µm.

4. A method of claim 3, wherein the thickness of the upper magnetic layer after the drying is 0.1 to 0.5 µm.

5. A method of claim 1, wherein said horizontal orientation is conducted while a residual amount of the solvent in the solvent containing solution layer for the upper magnetic layer is in a range from 40 to 100% by weight based on the total weight of the solvent in the solvent containing solution layer for the upper magnetic layer, and with a magnetic field having an intensity of 100 to 600% of the magnetic force of said magnetic powder in the direction of said magnetizable axes.

6. A method of claim 5, wherein the thickness of the upper magnetic layer after the drying is 0.1 to 0.5 µm.

7. A method of claim 1, wherein said oblique or perpendicular orientation is conducted by applying a magnetic field having an intensity of 50 to 600% of the magnetic force of the magnetic powder to the solvent containing solution for the upper magnetic layer in the direction of the magnetizable axes.

8. A method of claim 7, wherein the thickness of the upper magnetic layer after the drying is 0.1 to 0.5 µm.

9. A method of claim 1, wherein the thickness of the upper magnetic layer after the drying is 0.1 to 0.5 µm.

* * * * *